United States Patent [19]
Wiese

[11] 4,099,728
[45] Jul. 11, 1978

[54] MECHANICAL SEAL ASSEMBLY

[75] Inventor: Winfred John Wiese, Whittier, Calif.

[73] Assignee: Borg-Warner Corporation, Chicago, Ill.

[21] Appl. No.: 842,863

[22] Filed: Oct. 17, 1977

[51] Int. Cl.² ............................................. F16J 15/34
[52] U.S. Cl. .......................................... 277/96; 277/3; 277/93 SD
[58] Field of Search ................. 277/96, 96.1, 96.2, 277/93 R, 93 SD, 95, 3, 27

[56] References Cited

U.S. PATENT DOCUMENTS

| 3,042,414 | 7/1962 | Tracy | 277/93 X |
| 3,227,463 | 1/1966 | Wiese | 277/93 |
| 3,360,272 | 12/1967 | Blom et al. | 277/3 |
| 3,459,430 | 8/1969 | Ball | 277/9 X |
| 3,628,799 | 12/1971 | Wiese | 277/27 |
| 3,638,957 | 2/1972 | Marsi | 277/96.1 |
| 3,843,140 | 10/1974 | Mayer et al. | 277/96.1 X |
| 3,957,276 | 5/1976 | Wiese | 277/96.1 X |

Primary Examiner—Robert S. Ward, Jr.
Attorney, Agent, or Firm—Aubrey L. Burgess

[57] ABSTRACT

A mechanical seal assembly having a backup ring for a soft seal ring that minimizes distortion of the soft seal ring. A mechanical seal assembly wherein at least one of the seal faces is constructed and arranged to provide substantially constant seal balance as the seal ring wears down in operation.

7 Claims, 2 Drawing Figures

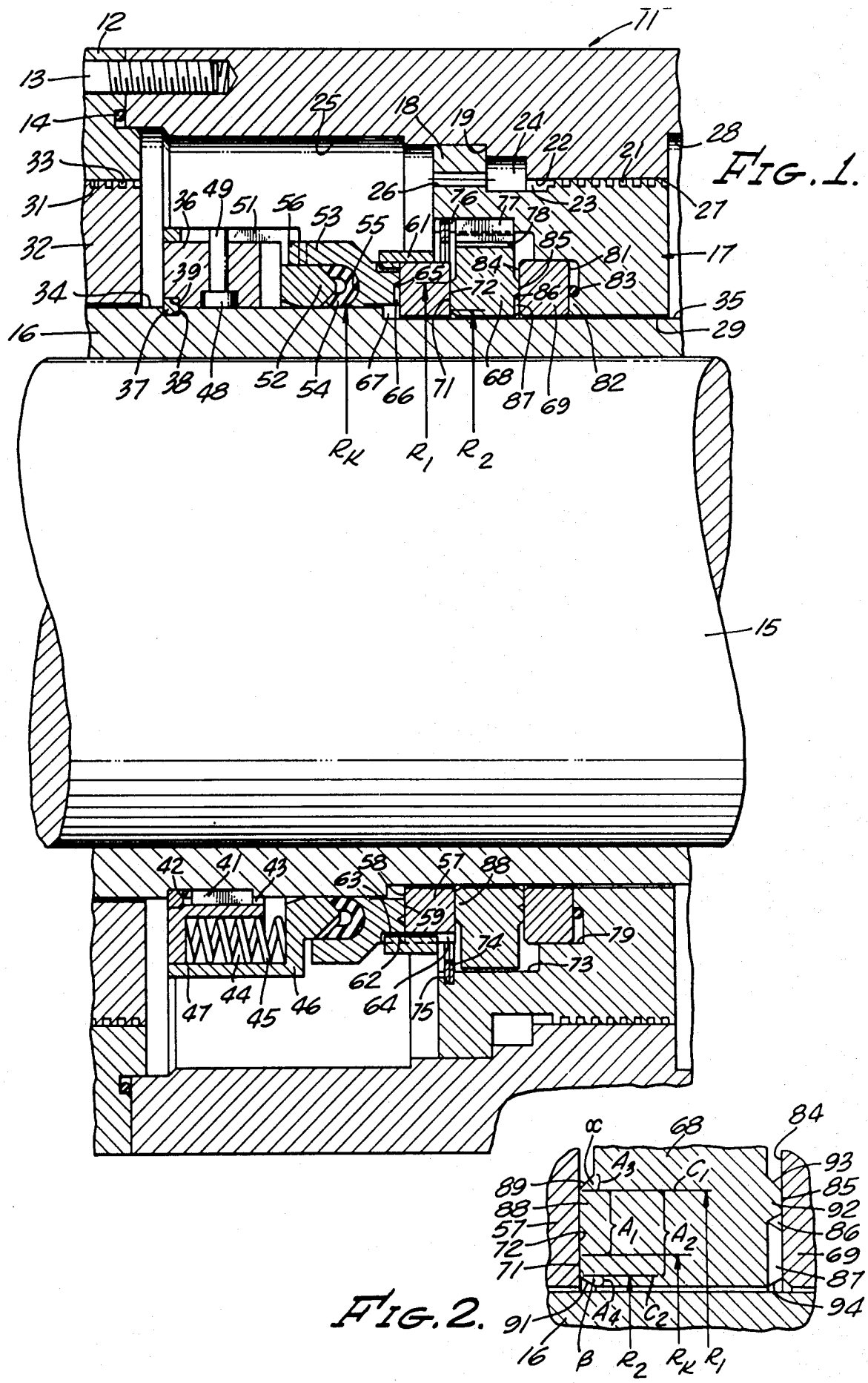

MECHANICAL SEAL ASSEMBLY

BACKGROUND OF THE INVENTION

1. Field of the Invention

This invention relates to a mechanical seal assembly, and more particularly to a mechanical seal assembly for sealing a rotary shaft to a housing to prevent liquid under high pressure in the housing from escaping between the rotary shaft and the housing.

2. Description of the Prior Art

U.S. Pat. No. 3,360,272, issued Dec. 26, 1967, C. J. Blom et al, "Pressure Staging Mechanical Seal", discloses a plurality of mechanical seal assemblies arranged in stages. Each of the individual mechanical seal assemblies disclosed in the Blom et al patent is generally of the type to which the present invention pertains. Although the individual mechanical seal assemblies of the Blom et al patent are generally quite satisfactory, the distortion of the graphite or carbon stationary seal ring can be lessened. Moreover, the characteristics of the seal as the carbon ring wears away during operation can be improved.

SUMMARY OF THE INVENTION

An object of the invention is to provide a mechanical seal assembly of the foregoing type wherein distortion of the stationary seal ring is lessened. In accordance with the invention, this object is realized in a mechanical seal assembly for sealing a rotary shaft to a housing having a shaft opening through which the shaft extends, said mechanical seal assembly having: a rotatable sealing ring mounted on and rotatable with the shaft, said rotatable sealing ring having limited movability axially of the shaft; a nonrotatable sealing ring comprising relatively soft material; said sealing rings having opposed, generally radial surfaces in relatively rotatable sealing relationship; a backup ring comprising sintered hard metallic carbide supporting said nonrotatable sealing ring on its side opposite to its generally radial surface; said backup ring and said nonrotatable sealing ring having opposed, generally radial sealing surfaces in stationary sealing relationship; and said housing having a stationary support flange surrounding the shaft, said flange supporting said backup ring on its side opposite to said generally radial sealing surface.

Another object of the invention is to provide a mechanical seal assembly wherein the balance of the seal rings remains substantially constant as the seal rings wear away.

In accordance with the invention, this object is achieved in a mechanical seal assembly comprising: a housing having a shaft opening; said housing being exposed at one location to a relatively high fluid pressure and at another location to a fluid pressure less than said relatively high fluid pressure; a shaft rotatable in said opening; relatively rotatable mechanical seal means for sealing said opening comprising a first annular seal ring connected to said housing and a second annular seal ring connected to said shaft; one of said seal rings being longitudinally movable; said annular seal rings having transverse engaging annular seal faces; one of which is substantially harder than the other such that the seal face of the softer material will take substantially all of the longitudinal wear as said seal faces rotate relative to one another; said softer seal face having an inner radius greater than and an outer radius less than the corresponding radii of said harder face; said seal ring having said harder seal face having a balance radius of constant length greater than the inner radius yet less than the outer radius of said softer seal face; said softer seal face being provided by an annular boss on said other seal ring having an outer side sloping outwardly in a direction away from said one seal ring and an inner side sloping inwardly in a direction away from said other seal ring; the slopes of the sides of said boss being selected in relation to the balance radius, and the inner and outer radii of the softer seal face such that, as said boss wears away in operation of the seal, the inner radius of said softer seal face decreases and the outer radius of said softer seal face increases to maintain the balance of said seal rings substantially constant.

BRIEF DESCRIPTION OF THE DRAWINGS

In the drawings

FIG. 1 is an axial sectional view of a mechanical seal assembly in accordance with the invention; and FIG. 2 is an enlarged fragmentary view of a portion of the assembly shown in FIG. 1.

DESCRIPTION OF THE PREFERRED EMBODIMENT

Referring to the drawings, the mechanical seal assembly shown therein is embodied in one stage of a pressure staging mechanical seal assembly such as is disclosed in U.S. Pat. Nos. 3,360,272, issued Dec. 26, 1967, C. J. Blom et al or U.S. Pat. No. 3,459,430, issued Aug. 5, 1969 to R. E. Ball.

The assembly includes a housing having a generally cylindrical housing section 11 fastened to another generally cylindrical housing section 12 by bolts 13, only one of which appears in FIG. 1. The housing sections 11 and 12 are statically sealed to each other by an O-ring seal 14.

Extending through the housing and centrally thereof is a rotatable shaft 15. The shaft has a shaft sleeve 16 that closely surrounds the shaft and is keyed or otherwise fastened to the shaft, by means not shown, for rotation with the shaft.

Mounted within the housing is an annular flange 17. The flange has an outwardly extending retainer rim 18 seated on a shoulder 19 provided by the housing section 11 which blocks movement of the flange to the right, as seen in FIG. 1. The flange has a helical passage 21 formed in its outer periphery, which has a close fit with a bore 22 provided in the housing section 11. The helical passage communicates in its upstream end 23 with an annular chamber 24 provided by the housing section 11 and the annular flange 17. This chamber communicates with a seal chamber 25 through a port 26. The downstream end 27 of the helical passage communicates with another chamber 28 that may contain another mechanical seal assembly providing another stage operating at lower fluid pressure than obtains in the seal chamber 25. The flange 17 has a central bore 29 through which the shaft sleeve 16 extends with running clearance.

The housing section 12 has a bore 31 receiving another flange 32, similar to the flange 17 described hereinbefore. The flange 32 and the housing section 12 provide a helical fluid passage 33 similar to the helical passage 21 described hereinbefore. These helical passages provide pressure reducing means between adjacent stages of a pressure staging mechanical seal assembly, as described more fully in the foregoing patents to Blom et al and to Ball.

The shaft sleeve 16 has a step 34 of somewhat larger diameter than the reducing portion 35 of the sleeve. This step portion carries the rotary parts of the mechanical seal assembly. Mounted on the step 34 is a spring holder 36, the spring holder being in the form of an annular member that encircles the step. A split retaining ring 37 is carried in a groove 38 in the shaft sleeve 16 and is received in an opposed groove 39 formed in the spring holder 36. It is apparent that the retaining ring 37 holds the spring holder against movement to the left along the shaft sleeve, as seen in FIG. 1. The spring holder is driven or rotated by the shaft sleeve through a key 41 fitted into a keyway 42 in the shaft sleeve and into a corresponding slot 43 in the spring holder. The spring holder is provided with longitudinal extending spring pockets 44, only one of which appears in the drawing, the spring pockets being located circumferentially of the spring holder. Helical springs 45 are compressed into the spring pockets and thereupon a U-cup follower 46 to urge it to the right, as seen in FIG. 1. The U-cup follower is an annular chamber having a skirt 47 that slides longitudinally on the outer periphery of the spring holder 36. A drive pin 48 extends radially through the spring holder and has its outer end 49 projecting into a longitudinal slot 51 in the U-cup follower, whereby the U-cup follower is caused to rotate with the spring holder yet is free to slide longitudinally of the spring holder. The U-cup follower has an annular nose 52, the inner circumference of which slides along the step 34.

Slidably mounted on the step 34 is a rotary sealing ring holder 53, there being a U-cup gasket 54 interposed between the nose 52 of the U-cup follower and the rearwardly facing surface 55 of the rotary sealing ring holder. Thus, fluid is prevented by the gasket from leaking through the clearance between the shaft step 34 and the holder 53.

In the rear of the sealing ring holder 53 is an integral tang 56 that projects into the longitudinal slot 51 of the U-cup follower 46 by means of which the rotary sealing ring holder is driven by and rotated with the U-cup follower; yet the rotary sealing ring holder may slide within limits longitudinally along the step 34.

A rotary seal ring 57, formed of hard and wear-resistant metal, has its rear face 58 positioned in abutment with the front face 59 of the holder 53. A retainer ring 61 encircles the seal ring 57 and the front portion of the holder 53 to thereby mount the rotary seal ring upon the front face of the holder. The retainer ring has inwardly projecting lugs 62 projecting into aligned slots 63 in the holder and 64 in the seal ring whereby the seal ring is caused to rotate with the holder 53. The front face 59 of the holder and the abutting rear face 58 of the rotary seal ring are lapped to provide fluid-tight joint. The front face 59 of the holder is provided with an annular groove 65 communicating through one or more radial grooves 66 with the space 67 for increasing the unit load between the rotary seal ring 57 and the holder 53. The manner in which the unit load is thereby increased is well-known in the art and is described more fully in U.S. Pat. No. 3,227,463, issued Jan. 4, 1966 to W. J. Wiese, the applicant herein.

From the foregoing description, it will be understood that the spring holder 36, the U-cup follower 46, the U-cup gasket 54, the holder 53, the retainer ring 61, and the rotary seal ring 57 are rotated by and with the shaft sleeve 16. It will also be seen that the helical springs 45 urge the U-cup follower, the holder 53 and the rotary seal ring 57 to the right, as seen in FIG. 1.

The non-rotating or stationary parts of the mechanical seal assembly are mounted on the annular flange 17 that is stationary in the housing section 11. The nonrotating parts include a stationary seal ring 69 and a stationary backup ring 69. The seal ring 68, which may be made of a soft material such as carbon, has an annular transverse seal face 71 disposed in sealing relationship to an opposed annular transverse sealing face 72 on the rotary seal ring 57. The stationary seal ring 68 is received within a bore 73 provided in the annular flange 17. The stationary seal ring is retained in the bore 73 by a snap ring 74 held in a groove 75 in the flange. The flange has a longitudinal keyway 76 fitted with a key 77 that extends into a parallel keyway 78 in the stationary seal ring to prevent the stationary seal ring from rotating.

The backup ring 69 is disposed in a counterbore 79 formed in the flange 17. The backup ring is annular, and its rear face 81 rests against an annular lip portion 82 that is integral with the flange 17. An O-ring seal 83 seals the backup ring to the flange. This O-ring is disposed in the counterbore 79 adjacent to the lip portion 82.

The backup ring has a front face 84 that abuts a rear face 85 on the stationary seal ring 68. These abutting faces are lapped to provide a static seal therebetween. An annular groove 86 that communicates with the space 67 through radial grooves 87 serve to increase the unit load exerted between the backup ring 69 and the stationary seal ring 68, as hereinbefore described with reference to grooves 65 and 66.

The backup ring 69 is formed of a sintered hard metallic carbide. The most preferred carbide is a sintered tungsten carbide alloy having a nickel binder therein. One such alloy is manufactured by Kennametal Inc. of Latrobe, Pa, under the designation K801. This alloy has a Young's modulus of elasticity of 89.6 million psi and a thermal conductivity of 47.4 BTU/hr./ft./° F.

Another sintered hard metallic carbide that is preferred for the manufacture of the backup ring is sintered titanium carbide. Such a titanium alloy is manufactured by Kennametal Inc. and designated K162B. This alloy is composed of granules of titanium carbide sintered with a nickel-molybdenum binder. The K162B alloy has a Young's modulus of elasticity of 59.0 million psi and a thermal conductivity of 11.1 BTU/hr./ft./° F.

The employment of a backup ring formed from a sintered hard metallic carbide for supporting the nonrotatable seal ring minimizes distortion of the seal face 71 by the backup ring 69. These backup rings of sintered hard metallic carbide are far superior to the stainless steel backup rings heretofore used. Stainless steel has a much lower Young's modulus of elasticity than the foregoing sintered hard metallic carbides, the modulus of elasticity of the stainless steel being about 29 million psi.

Distortions of the seal face 71 of the stationary seal ring are caused by distortions of the flange 17 as it is subjected to changes in fluid pressure differential thereacross. Such pressure changes bend the flange and such bending is transmitted through the backup ring to the stationary seal ring and cause warping or bending of the seal face 71. Because of its high modulus of elasticity, the sintered hard metallic carbide backup ring of this invention transmits much less distortion from the flange to the stationary seal ring than does the corresponding backup ring made of stainless steel.

A tungsten carbide ring is a much better conductor of heat than a similar backup ring made of stainless steel. The thermal conductivity of stainless steel is about 9.5 to 15 BTU/hr./ft./° F. compared to 47.4 BTU/hr./ft./° F. for the K801 alloy. Thus, the use of K801 alloy as the material of the backup ring enables heat to be conducted away from the stationary sealing ring at a rapid rate, and a rate much higher than the rate at which a similar stainless steel backup ring would function.

The annular transverse seal face 71 of the stationary seal ring 68 is provided by the front face of an annular boss 88 on the front of the stationary seal ring. The boss has an outer sloping side 89. As seen in FIG. 2, this side subtends an angle $\alpha$ with the construction line $C_1$. The boss also has an inner sloping side 91 that subtends an angle $\beta$ with the construction line $C_2$.

In a like manner, the rear face 85 of the stationary seal ring 68 is provided by the face of an annular boss 92 also defined by inner and outer sloping sides 93 and 94, respectively.

By using the sloping sides 89, 90 and 93, 94, sharp corners at juncture points do not exist. Avoiding sharp corners eliminates points of stress in the stationary face when under hydraulic load.

With pressure surrounding the carbon face 71, and the application of a force squeezing the face 71 inwardly, the thinner sections of the bosses 88 and 92 will try to reduce in size more than the thicker section (the central sections) of the seal ring 68. This causes the surfaces (faces 71 and 84) to distort and become concave. However, by defining the bosses 88 and 92 by sloping sides 89, 91 and 93, 94, respectively the amount of distortion and concavity of the surfaces is lessened and/or reduced, as compared to defining the bosses in a more conventional manner with straight, normal sides.

As the contact faces wear, the area increases, and results in a reduction in spring load and psi which results in a reduction in load with wear.

As indicated in the drawings, $R_k$ is the radius of the step 34, also known as the balance radius, $R_1$ is the outer radius of the seal face 71, and $R_2$ is the inner radius of the seal face 71.

Applicant has discovered that the slopes $\alpha$ and $\beta$ of the sides 89 and 91 of the boss can be selected in relation to $R_k$, $R_1$ and $R_2$ so that, as the boss wears away in operation of the seal, the balance of the seal rings remains substantially constant.

Applicant has found that the following equation should obtain in order to maintain the balance of the seal rings substantially constant:

$$\tan \beta = R_1(R_k^2 - R_2^2)/R_2(R_1^2 - R_k^2) \tan \alpha$$

The foregoing expression is derived as follows:

Let $A_1 =$ the annular area between $R_k$ and $R_1$ ∴ $A_1 = \pi(R_1^2 - R_k^2)$ Let $A_2 =$ the annular area between $R_1$ and $R_2$ ∴ $A_2 = \pi(R_1^2 - R_2^2)$ As the face shown wears, $A_1$ will increase by $R_1$ moving outward by an amount equal to $\Delta R_1$. Similarly, $A_2$ will increase by $R_1$ moving outward and by $R_2$ moving inward by an amount equal to $\Delta R_2$.

Call these increases in area $A_3$ (due to $\Delta R_1$) and $A_4$ (due to $\Delta R_2$). Initially, the seal is manufactured so that $A_1/A_2$ is a specific value K, also known as the balance of the seal. It is desired that as the seal wears, $A_1 + A_3/A_2 + A_3 + A_4$ remain essentially constant at K.

$A_3$ can be evaluated as $\pi[(R_1 + \Delta R_1)^2 - R_1^2]$ $A_4$ can be evaluated as $\pi[R_2^2 - (R_2 - \Delta R_2)^2]$ where $\Delta R_1$ and $\Delta R_2$ are functions of the wear ($\omega$)
Using as a basis the equation
$A_1 + A_3/A_2 + A_3 + A_4 = K$ and substituting $$K = \frac{\pi(R_1^2 - R_k^2) + \pi[(R_1 + \Delta R_1)^2 - R_1^2]}{\pi(R_1^2 - R_2^2) + \pi[(R_1 + \Delta R_1)^2 - R_1^2] + \pi[R_2^2 - (R_2 - \Delta R_2)^2]}$$

and simplifying $$K = \frac{[-R_k^2 + (R_1 + \Delta R_1)^2]}{[(R_1 + \Delta R_1)^2 - (R_2 - \Delta R_2)^2]}$$

$$K = \frac{(R_1 + \Delta R_1)^2 - R_k^2}{(R_1 + \Delta R_1)^2 - (R_2 - \Delta R_2)^2}$$

Again, $\Delta R_1$ and $\Delta R_2$ are functions of the wear ($\omega$)

$\tan \alpha = \Delta R_1/\omega$ and $\tan \beta = \Delta R_2/\omega$

∴ $\Delta R_1 = \omega \tan \alpha$ and $\Delta R_2 = \omega \tan \beta$
Substituting these values yields $$K = \frac{(R_1 + \omega \tan \alpha)^2 - R_k^2}{(R_1 + \omega \tan \alpha)^2 - (R_2 - \omega \tan \beta)^2}$$

Expanding these yields $$K = \frac{R_1^2 + \omega^2 \tan^2 \alpha + 2\omega R_1 \tan \alpha - R_k^2}{R_1^2 + \omega^2 \tan^2 \alpha + 2\omega R_1 \tan \alpha - R_2^2 - \omega^2 \tan^2 \beta + 2\omega R_2 \tan \beta}$$

Rearranging $$K = \frac{R_1^2 - R_k^2 + 2\omega R_1 \tan \alpha + \omega^2 \tan^2 \alpha}{R_1^2 - R_2^2 + 2\omega R_1 \tan \alpha + 2\omega R_2 \tan \beta + \omega^2(\tan^2 \alpha - \tan^2 \beta)}$$

With the wear, $\omega$, limited to 0.03 inches $\omega^2$ will equal 0.0009 and with the angles limited between 20° to 70° on either the O.D. or I.D. for good design practice, the last terms of the numerator and denominator therefore are both considered negligible and are eliminated so the equation reduces to $$K \simeq \frac{R_1^2 - R_k^2 + 2\omega R_1 \tan \alpha}{R_1^2 - R_2^2 + 2\omega(R_1 \tan \alpha + R_2 \tan \beta)}$$

eliminating the last two terms in the formula proceeding the above paragraph only effects the accuracy of the 4 place after the decimal point in the final answer, but still insures that K remains essentially constant.

Since K was previously defined as $$K = A_1/A_2$$

Then $$K = \frac{A_1}{A_2} = \frac{\pi(R_1^2 - R_k^2)}{\pi(R_1^2 - R_2^2)} = \frac{R_1^2 - R_k^2}{R_1^2 - R_2^2}$$

Substituting $$\frac{R_1^2 - R_k^2}{R_1^2 - R_2^2} \simeq \frac{R_1^2 - R_k^2 + 2\omega R_1 \tan\alpha}{R_1^2 - R_2^2 + 2\omega(R_1 \tan\alpha + R_2 \tan\beta)}$$

Expanding and simplifying $$(R_1^2 - R_k^2)[R_1^2 - R_2^2 + 2\omega(R_1 \tan\alpha + R_2 \tan\beta)] \simeq (R_1^2 - R_2^2)(R_1^2 - R_k^2 + 2\omega R_1 \tan\alpha)$$

$$(R_1^2 - R_k^2)(R_1^2 - R_2^2) + (R_1^2 - R_k^2)[2\omega(R_1 \tan\alpha + R_2 \tan\beta)] \simeq (R_1^2 - R_k^2)(R_1^2 - R_2^2) + (R_1^2 - R_2^2)(2\omega R_1 \tan\alpha)$$

$$(R_1^2 - R_k^2)(2\omega R_1 \tan\alpha + 2\omega R_2 \tan\beta) = (R_1^2 - R_2^2)(2\omega R_1 \tan\alpha)$$

$$R_1^2(2\omega R_1 \tan\alpha) + R_1^2(2\omega R_2 \tan\beta) - R_k^2(2\omega R_1 \tan\alpha + 2 R_2\omega \tan\beta) = R_1^2(2\omega R_1 \tan\alpha) - R_2^2(2\omega R_1 \tan\alpha)$$

$$2\omega R_1^2 R_2 \tan\beta - R_k^2(2\omega R_1 \tan\alpha + 2\omega R_2 \tan\beta) \simeq -2\omega R_1 R_2^2 \tan\alpha$$

Collecting terms $$2\omega R_1^2 R_2 \tan\beta - 2\omega R_2 R_k^2 \tan\beta \simeq 2\omega R_1 R_k^2 \tan\alpha - 2\omega R_1 R_2^2 \tan\alpha$$

$$2\omega \tan\beta (R_1^2 R_2 - R_2 R_k^2) \simeq 2\omega \tan\alpha (R_1 R_k^2 - R_1 R_2^2)$$

$$\tan\beta \simeq \tan\alpha \left(\frac{R_1 R_k^2 - R_1 R_2^2}{R_1^2 R_2 - R_2 R_k^2}\right)$$

$$\tan\beta \simeq \frac{R_1(R_k^2 - R_2^2)}{R_2(R_1^2 - R_k^2)} \tan\alpha$$

Since in practice, diameters are used, $$\tan\beta \simeq \frac{\frac{D_1}{2}\left(\left(\frac{D_k}{2}\right)^2 - \left(\frac{D_2}{2}\right)^2\right)}{\frac{D_2}{2}\left(\left(\frac{D_1}{2}\right)^2 - \left(\frac{D_k}{2}\right)^2\right)} \tan\alpha$$

$$\tan\beta \simeq \frac{\frac{1}{8}D_1(D_k^2 - D_2^2)}{\frac{1}{8}D_2(D_1^2 - D_k^2)} \tan\alpha$$

$$\tan\beta \simeq \frac{D_1(D_k^2 - D_2^2) \tan\alpha}{D_2(D_1^2 - D_k^2)}$$

Whereas, the foregoing expression enables the balance to be maintained almost exactly constant, it is sometimes desired that the balance be lowered or raised slightly as the boss wears away. It is therefore to be recognized that the angles $\alpha$ and $\beta$ can deviate somewhat from the relationship established by the foregoing expression without departing from the invention, as long as the seal balance remains substantially constant as the boss wears away.

It is believed that the operation of the seal will be apparent to those skilled in the art from the foregoing description.

I claim:

1. A mechanical seal assembly comprising:
   a housing having a shaft opening;
   said housing being exposed at one location to a relatively high fluid pressure and at another location to a fluid pressure less than said relatively high fluid pressure;
   a shaft rotatable in said opening;
   relatively rotatable mechanical seal means for sealing said opening comprising a first annular seal ring connected to said housing and a second annular seal ring connected to said shaft;
   one of said seal rings being longitudinally movable;
   said annular seal rings having transverse engaging annular seal faces; one of which is substantially harder than the other such that the seal face of the softer material will take substantially all of the longitudinal wear as said seal faces rotate relative to one another;
   said softer seal face having an inner radius greater than and an outer radius less than the corresponding radii of said harder face;
   said seal ring having said harder seal face having a balance radius of constant length greater than the inner radius yet less than the outer radius of said softer seal face;
   said softer seal face being provided by an annular boss on said other seal ring having an outer side sloping outwardly in a direction away from said one seal ring and in inner side sloping inwardly in a direction away from said other seal ring;
   the slopes of the sides of said boss being selected in relation to the balance radius, and the inner and outer radii of the softer seal face such that, as said boss wears away in operation of the seal, the inner radius of said softer seal face decreases and the outer radius of said softer seal face increases to maintain the balance of said seal rings substantially constant.

2. A mechanical seal ring as recited in claim 1, wherein said seal ring having said softer face comprises carbon and said seal ring having said harder face comprises tungsten carbide.

3. A mechanical seal ring as recited in claim 1, wherein said seal ring having said harder seal face is connected to said shaft and said seal ring having said softer seal face is connected to said housing.

4. A mechanical seal ring as recited in claim 1, wherein the tangent of the angle of slope of said inner side of said boss is substantially equal to the tangent of the angle of slope of said outer side of said boss times the expression $$R_1(R_k^2 - R_2^2)/R_2(R_1^2 - R_k^2)$$

in which $R_1$ and $R_2$ are respectively the outer and inner radii of said softer seal face in its unworn state, and $R_k$ is the balance radius of said seal ring having said harder seal face.

5. A mechanical seal assembly for sealing a rotary shaft to a housing having a shaft opening through which the shaft extends, said mechanical seal assembly having:
- a rotatable sealing ring mounted on and rotatable with the shaft, said rotatable sealing ring having limited movability axially of the shaft;
- a nonrotatable sealing ring comprising relatively soft material;
- said sealing rings having opposed, generally radial surfaces in relatively rotatable sealing relationship;
- a backup ring comprising sintered hard metallic carbide supporting said nonrotatable sealing ring on its side opposite to its generally radial surface;
- said backup ring and said nonrotatable sealing ring having opposed, generally radial sealing surfaces in stationary sealing relationship; and
- said housing having a stationary support flange surrounding the shaft, said flange supporting said backup ring on its side opposite to said generally radial sealing surface.

6. A mechanical seal assembly as recited in claim 5, wherein said backup ring comprises sintered tungsten carbide.

7. A mechanical seal assembly as recited in claim 5, wherein said backup ring comprises sintered titanium carbide.